United States Patent [19]

Turner

[11] Patent Number: 5,642,476
[45] Date of Patent: Jun. 24, 1997

[54] COMPUTER GENERATED VARIABLE LINE WIDTH OF A VECTOR GRAPHIC

[75] Inventor: John B. Turner, Mountain View, Calif.

[73] Assignee: Apple Computer, Inc., Cupertino, Calif.

[21] Appl. No.: 414,630

[22] Filed: Mar. 31, 1995

[51] Int. Cl.⁶ ................................................ G06T 11/60
[52] U.S. Cl. ...................... 395/143; 395/169; 395/141; 395/142; 395/168
[58] Field of Search ................................ 395/141, 142, 395/143, 169, 168

[56] References Cited

U.S. PATENT DOCUMENTS

5,101,788   4/1992   Demizu et al. ..................... 123/425
5,434,959   7/1995   Von Ehr, II et al. ................. 395/141

Primary Examiner—Phu K. Nguyen
Assistant Examiner—Sabrina Dickens
Attorney, Agent, or Firm—Carr, DeFilippo & Ferrell

[57] ABSTRACT

In a computer system, a method and an apparatus for varying contour widths of a vector graphic. The method including the steps of reading vector shape data having a contour, control points, a bulge position, a bulge width, and a base position, determining new border control points along the contour, and drawing a new variable width contour using the new border control points from the base control point to a bulge position control point. The apparatus of the present invention includes a processor, an operating system memory coupled to the processor, a vector shape database memory coupled to the processor for storing data that defines the vector shape, a routines memory coupled to the processor for controlling the operating system memory and the processor, and a control variables memory coupled to the processor for storing control variables that direct the routines memory.

20 Claims, 8 Drawing Sheets

COMPUTER GENERATED VARIABLE LINE WIDTH OF A VECTOR GRAPHIC

BACKGROUND OF THE INVENTION

1. Field of the Invention

The present invention relates generally to graphics generated on a computer. More particularly, the present-invention relates to modification of existing computer line graphics. Specifically, the present invention relates to an apparatus and method for modifying computer generated vector graphics to have a more humanistic appearance by varying the line widths of the vector graphics.

2. Description of Related Art

Computer graphics can be divided into two broad categories, raster and vector. These categories differ primarily in the manner that drawing data is created, stored, and edited. Raster graphics, often called bitmaps, are two dimensional arrays of picture elements. Similar to grains in a photograph, each picture element (pixel) has a color value. The collection of these pixels and their corresponding values form a raster image.

In contrast, vector graphics are based on a definition of geometric shapes. Shapes are defined by precise mathematically defined Cartesian points. Thus, the shapes may be lines, rectangles, curves, or any arbitrary polygon defined by mathematical points. The collection of these geometric shapes and their mathematical definitions form a computer vector drawing.

Shapes in a vector drawing are divided up into strokes and fills. Strokes indicate that a vector shape should be drawn with a constant width of pixels of some color value. Fills indicate that the boundary of a shape should be closed and the interior filled with pixels of some color value. Strokes and fills that share the same shape differ in the method by which a shape is rendered.

A long-standing goal in computer graphics has been to enable computer users to produce output that does not look computer generated. The very strength of computer graphics, that is, the exact definition of an image or drawing, has been a liability because humans do not draw with such perfection. Consequently, most graphics generated on a computer look artificial.

When using raster graphics, the problem of the artificial appearance of drawings can be corrected somewhat by using digital filters. The color value of each pixel within a raster image is modified algorithmically by a digital filter. The filtering algorithms, originally based on photographic image processing, can get very complex and can provide interesting "painting" effects. Raster digital filters can modify raster images and create such appearances as watercolor or oil painting.

Unfortunately, the effects available to raster graphics do not apply to vector graphics. The analogy again is the difference between photographs and mathematical graphs. A computer user working with the desirable preciseness of vectors graphics must forfeit the pleasure of automatically producing a vector that could appear hand drawn.

Therefore, there is a strong desire for a system that would enable a computer draftsman to benefit from the preciseness offered by vector graphics, but also be able to simply and easily produce more humanistic appearing drawings.

SUMMARY OF THE INVENTION

The present invention overcomes the limitations and shortcomings of the prior art and provides creative transformations of existing vector generated images into more humanistic drawings by varying the line width of vector shapes. The present invention includes a method and an apparatus for varying the width of a vector graphic. The method includes the steps of reading vector shape data having a contour, control points, a bulge position, a bulge width, and a base position, determining new border control points along the contour, and drawing a new variable width contour using the new border control points from the base control point to a bulge position control point. The apparatus of the present invention includes a processor, an operating system memory coupled to the processor, a vector shape database memory coupled to the processor for storing data that defines the vector shape, a routines memory coupled to the processor for controlling the operating system memory and the processor, and a control variables memory coupled to the processor for storing control variables that direct the routines memory.

DETAILED DESCRIPTION OF THE PREFERRED EMBODIMENTS

The present invention provides a method and apparatus for varying the line width of a computer generated vector graphic. Vector shape data is received and stored by the apparatus, and the apparatus then modifies the original vector shape to produce a graphic having lines of varying widths. Control variables are used to determine how various aspects of the vector shape are to be modified.

Referring now to FIGS. 1A–1K, an overview of the various intermittent steps for modifying a vector shape in accordance with the variable line width method of the present invention is illustrated.

Figure 1A:
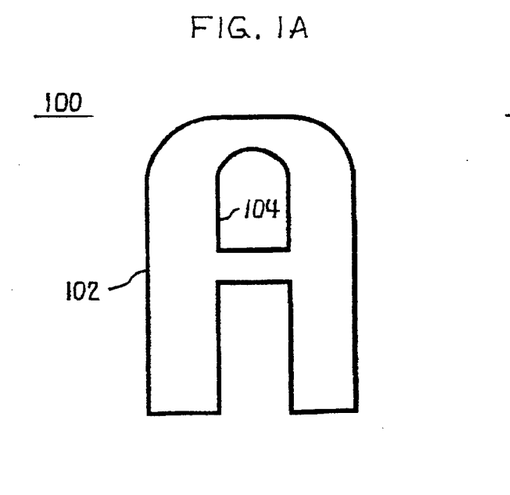
FIG. 1A illustrates a vector shape before being modified by the present invention.

Referring first to FIG. 1A, an example of a vector shape 100, a graphic representation of the letter "A" that contains two contours 102 and 104, is illustrated. A contour is defined as a separate, continuous line passing through predetermined control points in accordance with a predetermined type of shape definition to form a particular shape. Similarly, a control point is one of several control points that, in combination with the type of shape definition, determine how a contour is to be drawn. Several contours may be combined to define one complete vector shape. With reference to vector shape 100, contour 102 defines an exterior contour and contour 104 defines an interior contour. Contours 102 and 104 combine to form the original outline of the vector shape 100.

Figure 1B:
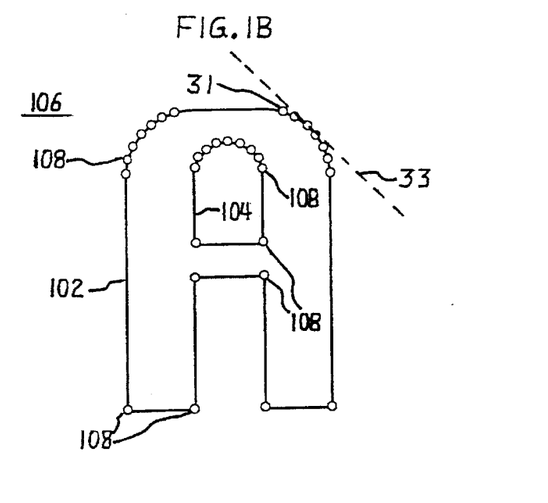
FIG. 1B illustrates contours and control points defining the vector graphic of FIG. 1A before being modified by the present invention.

Referring to FIG 1B, a vector shape 106 is illustrated which depicts the contours 102 and 104. FIG. 1B also illustrates control points 108 which define the vector shape 106.

Figure 1C:
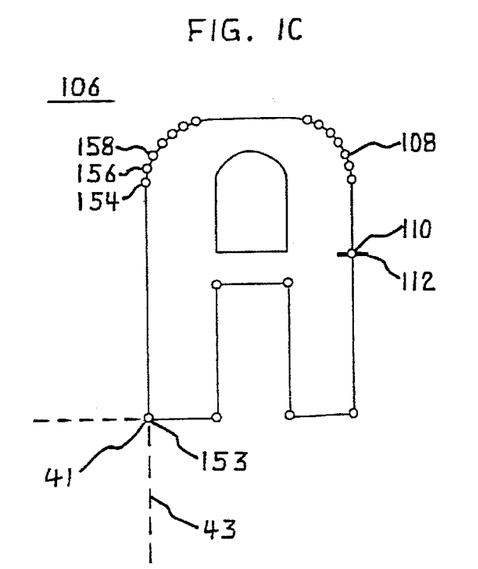
FIG. 1C illustrates an intermittent step of indicating a bulge position and a bulge width of the vector graphic of FIG 1B in accordance with the present invention.

Referring next to FIG. 1C, the control points 108 for the exterior contour 102 are illustrated. Also illustrated is a bulge position control point 110 that designates the location for the maximum width 112 of a resulting vector shape to be generated. The bulge position control point 110 is determined by a number of control variables, which are discussed in more detail below with reference to FIG. 4.

Figure 1D:
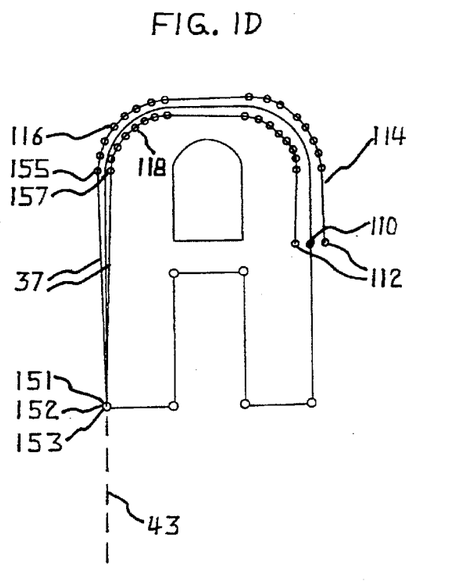
FIG. 1D illustrates an intermittent step of determining new border control points of the vector graphic of FIG. 1C in accordance with the present invention.

Referring to FIG. 1D, illustrated are the initial stages of forming a variable width polygon 114 accomplished by generating first and second new border control points, 116 and 118 respectively, for each control point 108 in the original exterior contour 102. The first and second new border control points 116,118 are generated based on a gradual increase in width from the minimum base pen width at control point 152 to the maximum width 112 at bulge position control point 110.

Figure 1E:
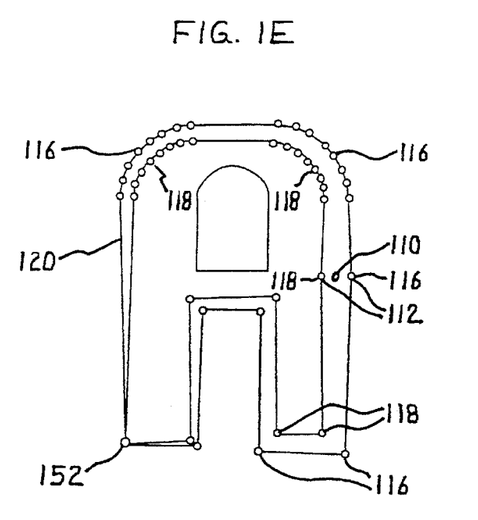
FIG. 1E illustrates an intermittent step of drawing a new contour having a variable width as determined by the new border control points of the vector graphic of FIG. 1D in accordance with the present invention.

Referring to FIG. 1E, newly generated vector graphic 120 is illustrated having a width that increases from control point 152 to bulge position control point 110, and then decreases from bulge position control point 110 to control point 152. First and second new border control points 116, 118 also are illustrated.

Figure 1F:
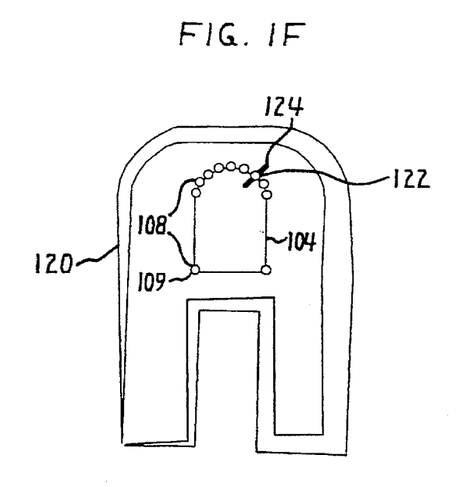
FIG. 1F illustrates an intermittent step of indicating a bulge position and a bulge width of a second contour of the vector graphic of FIG. 1E in accordance with the present invention.

Referring to FIG. 1F, resulting vector graphic 120 having a variable width is illustrated. Also illustrated is interior contour 104, which is the next contour to be modified by the present invention. Control points 108, which include bulge position control point 122, and bulge width 124 are shown on the interior contour 104.

Figure 1G:
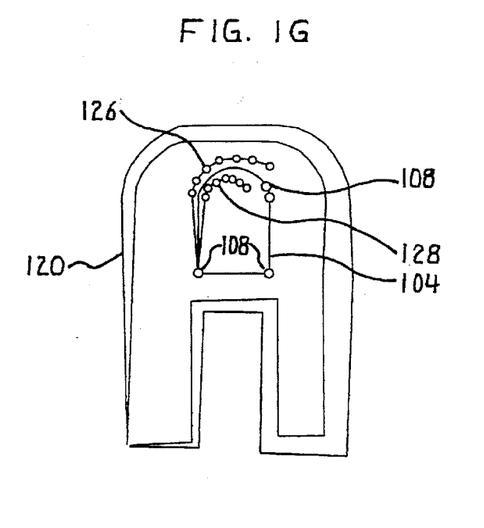
FIG. 1G illustrates an intermittent step of determining new border control points of the vector graphic of FIG. 1F in accordance with the present invention.

Referring to FIG. 1G, illustrated are the initial stages of forming a variable width vector shape corresponding to the interior contour 104. Formation of a new vector shape is accomplished by generating first and second new border control points, 126 and 128 respectively, for each control point 108 in the original interior contour 104. In this procedure, the first and second new border control points 126,128 are generated following the same procedure discussed above with reference to the new border control points 116,118 of exterior contour 102. The first and second new border control points 126,128 are generated based on a gradual increase in width from the minimum base pen width at control point 109 to the maximum width 124 at bulge position control point 112.

Figure 1H:
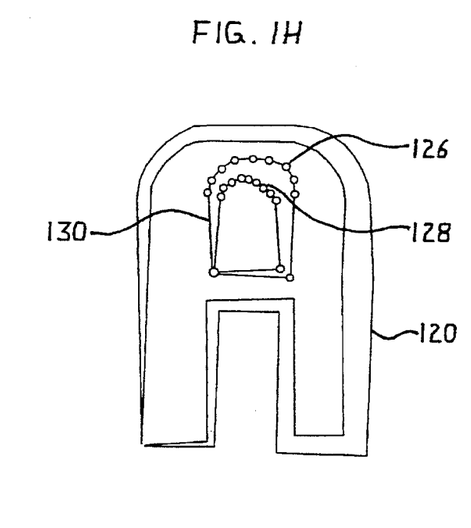
FIG. 1H illustrates an intermittent step of drawing a new contour having a variable width as determined by the new border control points of the vector graphic of FIG. 1G in accordance with the present invention.

Referring to FIG. 1H, newly generated vector graphic 130 is illustrated having a variable width. The first and second new border control points 126,128 also are illustrated.

Figure 1I:
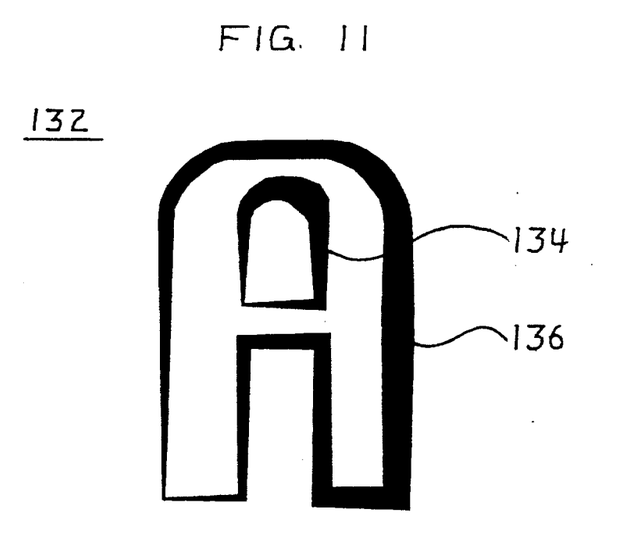
FIG. 1I illustrates a final resulting vector graphic following the sequence illustrated in FIGS. 1A–1H of the present invention.

Referring to FIG. 1I, final resulting vector graphic 132 is illustrated having variable width interior contour 134 and variable width exterior contour 136.

Figure 1J:
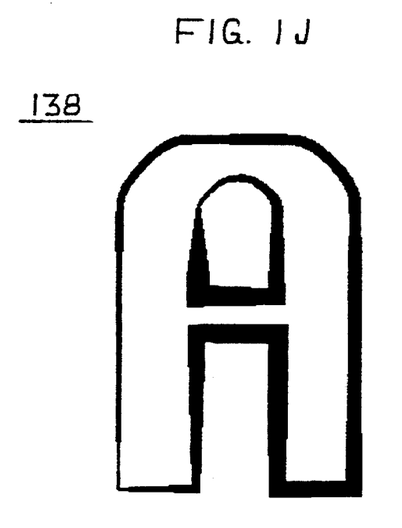
FIG. 1J illustrates an example of another resulting variation upon the original vector graphic 1A generated with different bulge positions in accordance with the present invention.

Referring to FIG. 1J, resulting vector graphic 138 is illustrated which was generated using different bulge positions and bulge widths.

Figure 1K:
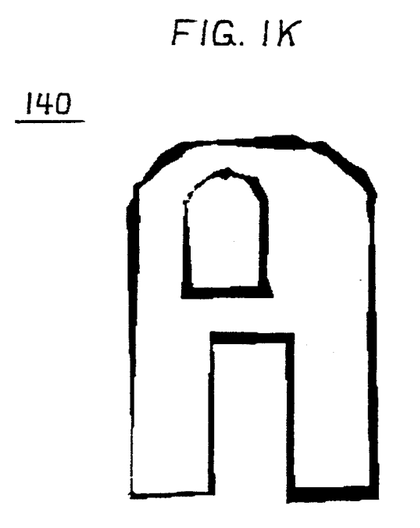
FIG. 1K illustrates a further resulting modification of the vector graphic 1A generated with different new bulge positions and in combination with a randomizing drawing routine.

Referring to FIG. 1K, resulting vector graphic 140 is illustrated which is another example of a generated vector graphic using different control variables and a randomizing graphic routine.

Figure 2:
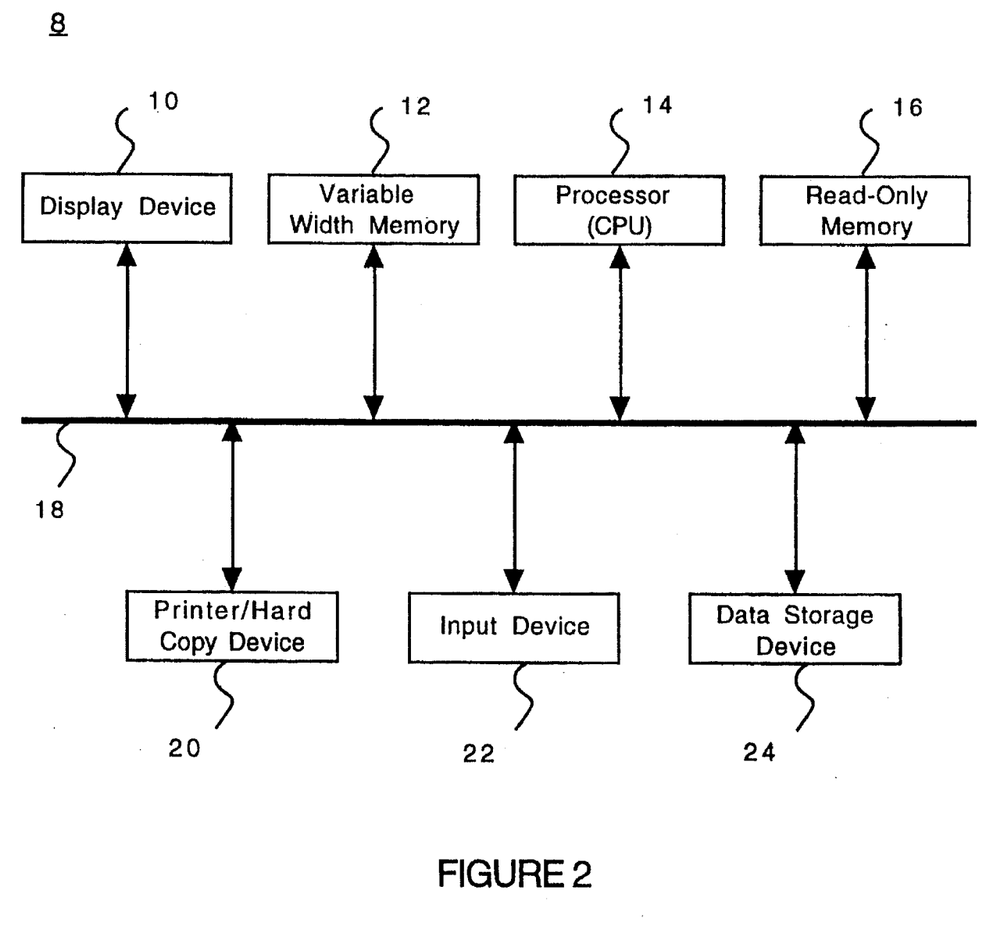
FIG. 2 is a block diagram of a computer system incorporating a preferred embodiment of the present invention.

Referring now to FIG. 2, a block diagram is illustrated of a preferred embodiment of a graphics generation and manipulation system 8 constructed in accordance with the present invention and capable of implementing the preferred method of the present invention. The graphics generation and manipulation system 8 includes a display device 10, a variable width memory 12, a central processing unit (CPU) 14, a read-only memory (ROM) 16, a printer/hard copy device 20, an input device 22, and a data storage device 24. The central processing unit (CPU) 14, display device 10, input device 22, variable width memory 12, and read-only memory (ROM) 16 are coupled in a von Neuman architecture via bus 18 such as in a personal computer.

The CPU 14 is preferably a microprocessor such as a Motorola 68040, IBM PowerPC 601, Intel 80486, or Intel Pentium®. The display device 10 is preferably a video monitor, and the input device 22 is preferably a keyboard and/or mouse type controller. The CPU 14 is also coupled to the printer/hard copy device 20 such as a laser printer in a conventional manner. The data storage device 24 preferably is a disk drive.

The system 8 can be implemented on various computer systems, including Apple Macintosh® and IBM PC-type computers. The CPU 14, under the guidance of instructions received from the variable width memory 12, ROM 16, and from the user through the input device 22, provides signals to be displayed on the display device 10.

Figure 3:
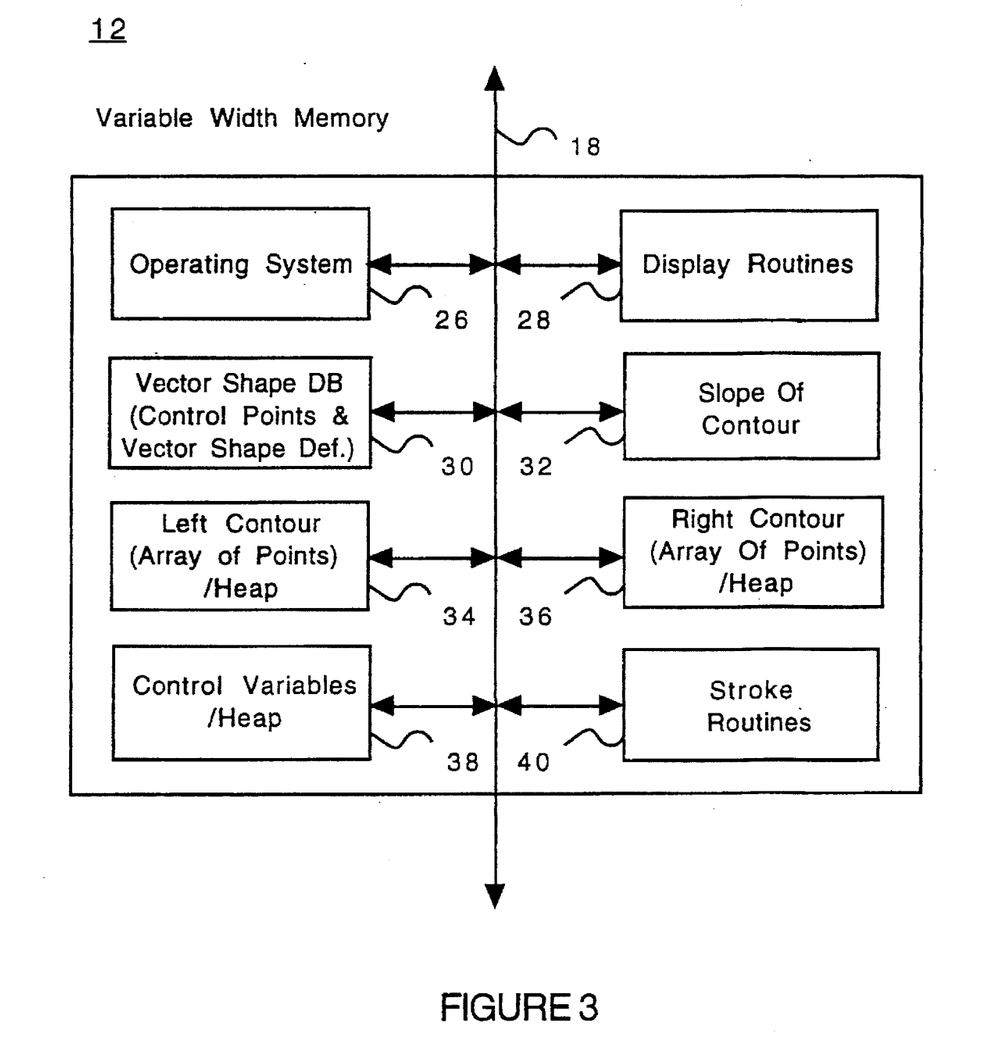
FIG. 3 is a block diagram of the variable width memory in FIG. 2.

Referring now to FIG. 3, a preferred embodiment of the variable width memory 12, which preferably is a random access memory (RAM), includes sub-memories for a conventional operating system 26, conventional graphics display routines 28, and a conventional vector shape database 30. The graphics display routines memory 28 stores a conventional routine for displaying vector shape data on the display device 10. The vector shape database memory 30 stores the vector shape data and associated data for the vector shapes to be modified, such as control points and vector shape definitions.

In accordance with the present invention, the variable width memory 12 further includes sub-memories for storing the slope of contour 32, left contour 34, right contour 36, control variables 38, and routines 40. The slope of contour memory 32 stores the slope of the contour at the current control point 108 being processed by the system 8. The slope 31 (FIG. 1B) is determined by creating a line segment 33 from the control points 108 immediately surrounding the current control point 108 and obtaining the angular slope 31 of the line segment 33.

The left contour memory 34 stores the array of generated border control points 116 on the left side of the original contour 102, all of which vary in perpendicular distance from the original contour 102. The right contour memory 36 stores the array of generated border control points 118 on the right side of the original contour 102, all of which vary in perpendicular distance from the original contour 102.

The stroke routines memory 40 stores the computer instructions and working data necessary for modifying a vector shape 100 in a manner designated by the control variables memory 38. The control variables memory 38, which stores the control variables, is illustrated in detail in FIG. 4.

Figure 4:
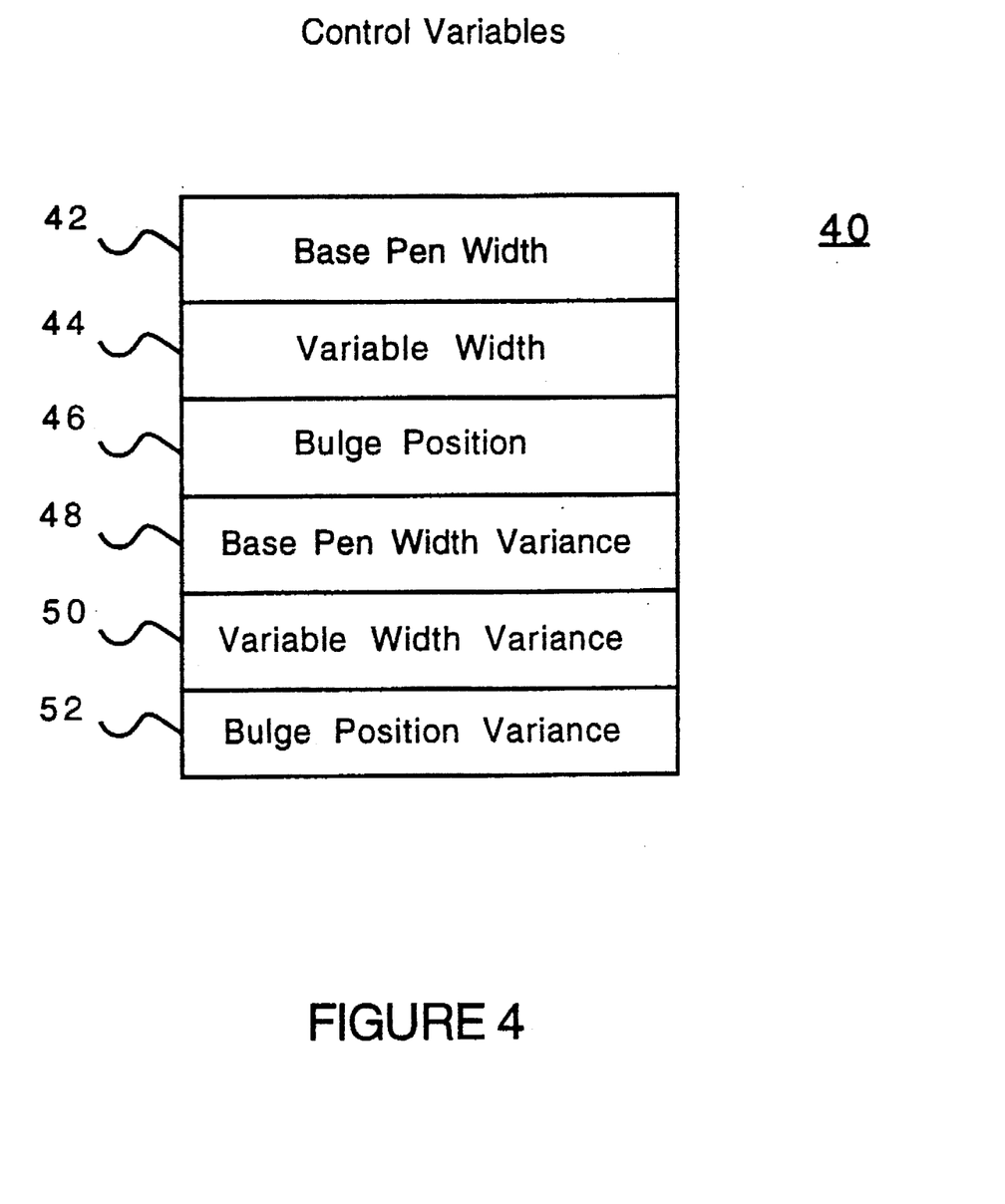
FIG. 4 is a block diagram of memory allocations for the control variables of FIG. 3.

Referring now to FIG. 4, a block diagram 40 of the control variables memory 38 is illustrated. The control variables memory 38 includes memory allocation for base pen width 42, variable width 44, bulge position 46, base pen width variance 48, variable width variance 50, and bulge position variance 52. Variables stored within the control variables memory 38 can be predetermined or defined by the user. The base pen width memory allocation 42 stores a value representing a minimum width or base width for a resulting stroke or line. The variable width memory allocation 44 stores a value representing the additional width at the bulge position 110, which when combined with the base pen width is the maximum width of a contour. The value stored in the variable width memory allocation 44 is added algorithmically to the value stored in the base pen width memory allocation 42 to generate a new line width for the newly generated vector shape 132.

The bulge position memory allocation 46 stores a value representing a percentage of a contour length at which the largest width should be located. The base width variance memory allocation 48 stores a value by which the base pen width stored in the memory allocation 42 is varied from contour to contour. Similarly, the variable width variance memory allocation 50 stores a value by which the variable width in memory allocation 44 is varied from contour to contour. Finally, the bulge position variance memory allocation 52 stores a value by which the bulge position 110 stored in memory allocation 46 is varied from contour to contour.

Figure 5A:
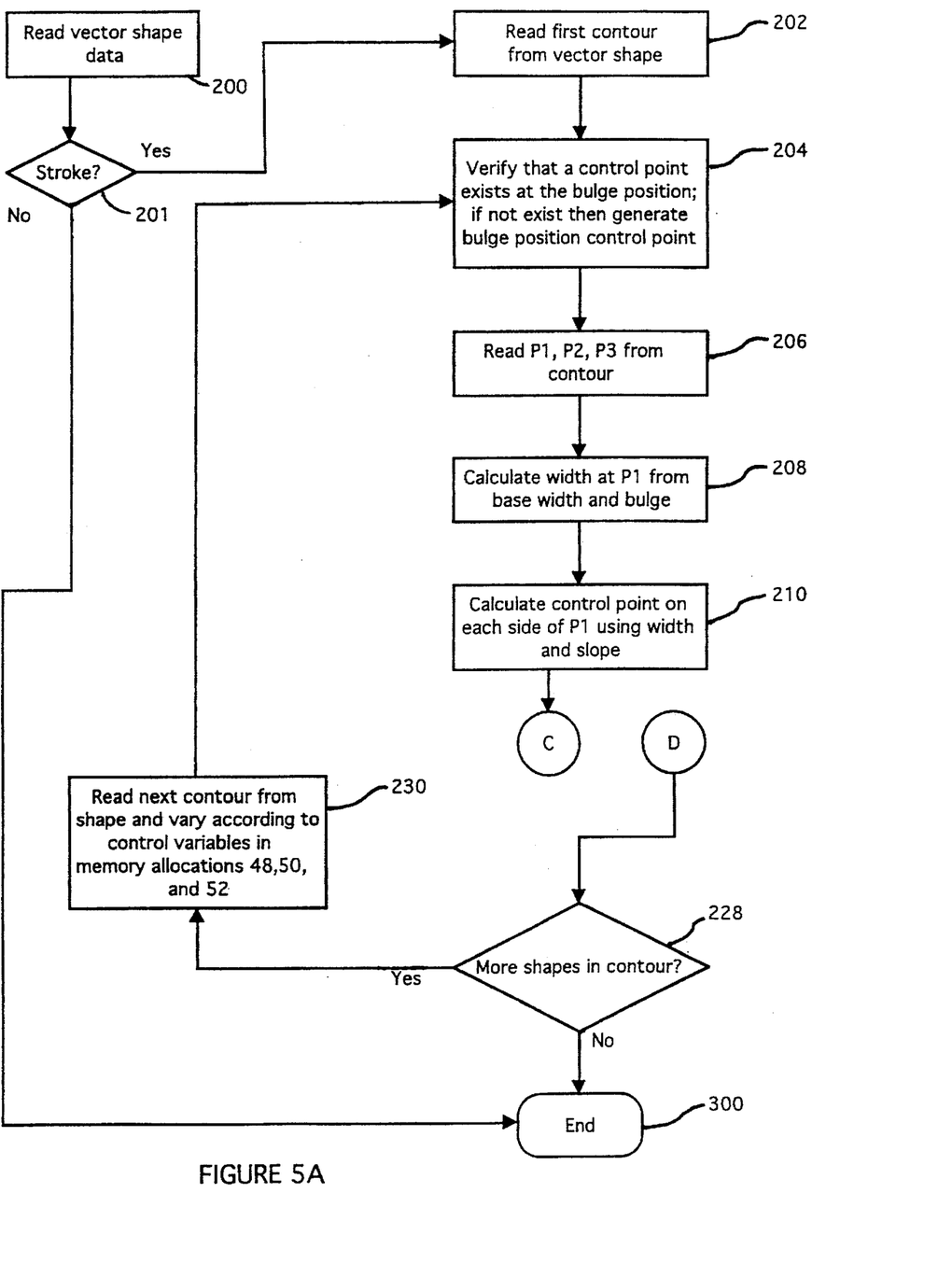
FIGS. 5A and 5B are a flowchart of the preferred variable line width method according to the present invention.
Figure 5B:
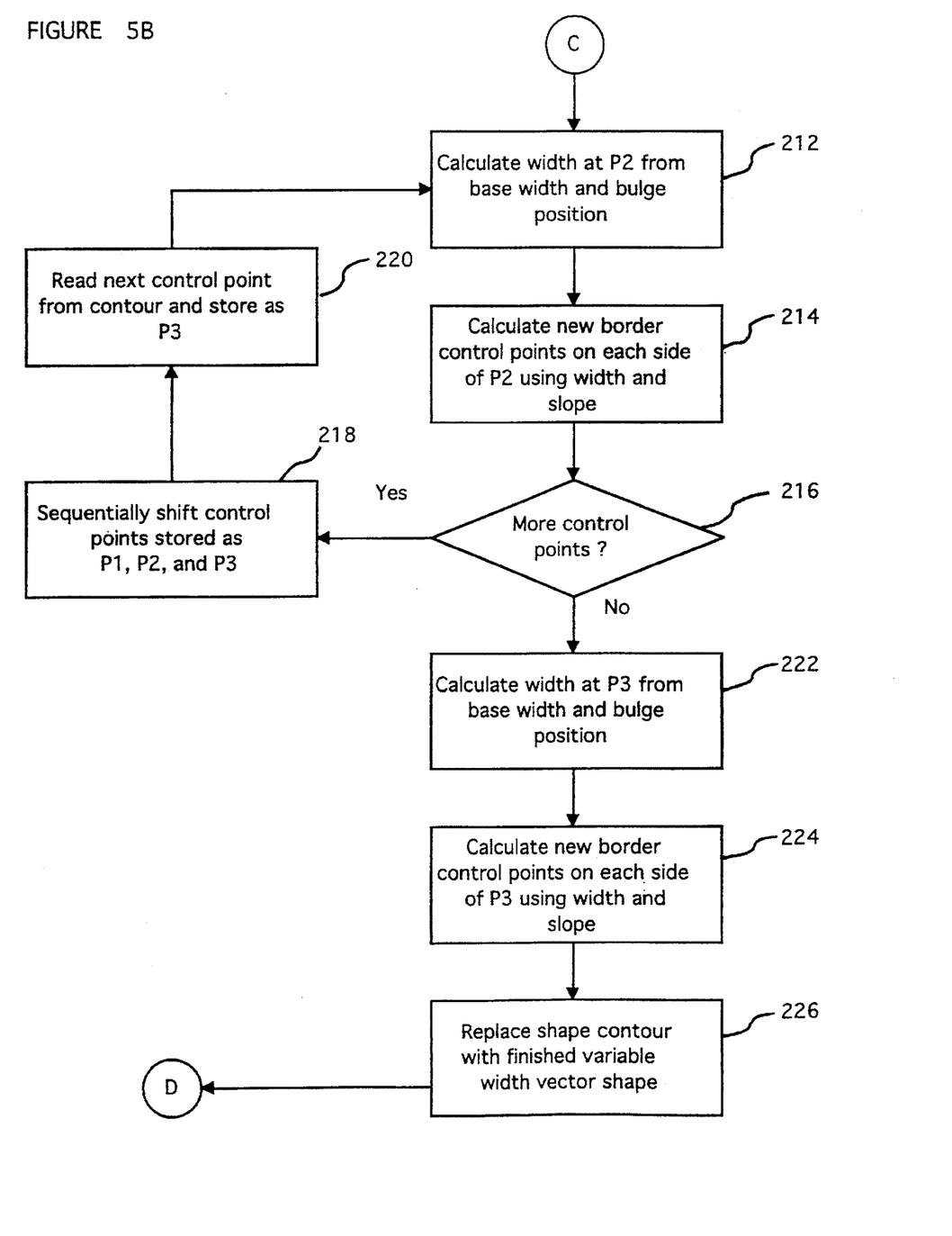

Turning now to FIGS. 5A and 5B, illustrated is a flowchart of a preferred method for modifying a vector shape according to the present invention. Beginning at step 200, the system 8 reads vector shape data. The vector shape data includes contours, control points, bulge positions, bulge widths, and base positions. A vector shape definition, such as a letter "A", is also included within the vector shape data to enable the system 8 to correctly arrange the control points 108 as a letter "A". The vector shape definition and control points 108 are received and stored in the vector shape database memory 30.

In step 201 the CPU 14 verifies that the vector shape 100 is a stroke and not a fill. Since this method only applies only to strokes, fill shapes are ignored by this invention. If the vector shape 100 is a fill shape, the method ends by going directly to end step 300. If the vector shape 100 is a stroke shape, the CPU 14 moves on to step 202 to read the first vector shape contour 102 from the vector shape database 30. In the illustrated example, the contour 102 is an outline of the letter "A".

Next in step 204 the system 8 verifies that a control point 108 exists at the bulge position 110. If a control point 108 does not already exist at the bulge position 110, then the system 8 generates a control point 108 at the bulge position 110. The bulge position 110 is a value representing the percentage of the entire length of the contour 102 at which the greatest width occurs. For example, if the bulge position stored in memory 46 was 50%, then at step 204 the system 8 would verify that a control point 108 was located at a position on the contour 102 that was half the length of the contour 102 from the beginning and base width control point 152.

In step 204, the system 8 reads the location stored in the bulge position memory 46 and attempts to find a point on the exterior contour 102 that matches the location stored in bulge position memory 46. If a control point 108 does not exists at the location of the bulge position 110, then a control point 108 is added to the group of control points 108 on the exterior contour 102 stored in the vector shape database memory 30.

Next in step 206 the system 8 reads the first three control points 108 of the exterior contour 102 from the vector shape database memory 30 and stores the working control points as P1, P2, and P3 in the stroke routines memory 40. In the illustrated example shown in FIG. 1C, the first three control points are labeled 152, 154, and 156, respectively. The order of the control points 108 within the contour 102 is stored in the vector shape database 30.

Calculating step 208 determines the width of the contour 102 at point 152. The contour width 37 is determined by referencing the base pen width memory 42, the variable width memory 44, and the bulge position memory 46. The contour width 37 at control point 108 before the bulge position 46 is determined as follows: (value in the base pen width memory 42)+((a percentage of the value in the variable width memory 44 equal to the length of the contour 102 up to the control point 108)÷(the contour length at the bulge position 110). In other words, the contour width 37 at point 152 (which is before the bulge point 110) is equal to the value in the base pen width memory 42 (in this case zero), plus the value in the variable width memory 44 multiplied by the result of the length of the contour 102 at p1 152 (which is zero because point 152 is the first control point) divided by the length of the contour 102 at the bulge position 110. The contour width before the bulge position can also be expressed as:

$$CW \text{ (before)} = BPW + (VW \times (CLB \div TLB))$$

BPW=base pen width
VW=variable width
CLB=current length of contour from begging of contour to current control point.
TLB=Total length of contour before bulge position.

So, if $PBW = 0$, $VW = 10$, $CLB = 40$, and $TLB = 100$, then
the width at the current control point would
be $= 0 + (10 \times .4)$
$= 4$ The contour width 37 at a control point 108 after the bulge position 110 is determined as follows: (value in the base pen width memory 42)+((a percentage of the value in the variable width memory 44 that is equal to the total length of the contour 102 minus the length of the contour 102 up to the control point 108)÷(contour length at the bulge position 110)).

The contour width 37 at a control point 108 after the bulge position 110 also may be expressed as follows:

$CW\ (after) = BPW + (VW - (VW \times (CLA \div TLA)))$

BPW=base pen width

VW=variable width

CLA=current length of contour from bulge position to current control point.

TLA=Total length of contour after bulge position.

So, if $PBW = 0$, $VW = 10$, $CLB = 30$, and $TLA = 300$, then
the width at the current control point would
be $= 0 + (10 - (10 \times .1))$
  $= 9$ Calculating step 210 determines two new border control points 151, 153 at opposing locations around control point 152 at the appropriate width (See FIG. 1D). The position of the two new border control points 151, 153 are derived from the slope 33 of the exterior contour 102 at p1 152 and the calculated width from step 208.

The slope 41 at control point 152 is determined by the slope 41 of a line segment 43 from a control point proceeding the current control point 152 and the control point 154 following the current control point 152. Since control point 152 is the first control point and no control points are proceeding the control point 152, the slope 41 is equal to the slope of the line segment 43 from control point 152 to control point 154. Once the slope 41 is calculated, the two new border control points 151 and 153 are created at plus and minus one half the width calculated at step 208 along the perpendicular (normal) of the slope 41. New border control points 151, 153 share the same location as control point 152 because the variable width at the first control point 152 is zero, as shown in FIG. 1D.

Referring now to step 212 in FIG. 5B, the system 8 determines the width at control point 154 using the same process described in step 208. In calculating step 214, the system 8 generates two new border control points 155, 157 surrounding control point 154 at the calculated width which is determined in the same manner as in the previous step 210.

At step 216 the system 8 checks for more control points 108 within the contour 102. If there are more control points 108 in the contour 102, the system 8 proceeds to step 218 wherein the system 8 sequentially shifts the working stored control points P1, P2, P3 and reads in the next control point 108. For example, in FIG. 1C the first three control points are 152, 154, 156. After calculating the width at control point 152 (wherein working points P1, P2, P3 were control points 152, 154, 156, respectively), the system 8 reads in the next control point 158 and sequentially shifts stored working points P1, P2, P3, thus making points P1, P2, and P3 now be control points 154, 156, 158, respectively. The system 8 then returns to step 212 and repeats the previously discussed cycle (steps 212, 214, 216, 218, 220) until there are no more control points 108 in the contour 102 at step 216.

The system 8 then proceeds to last control point 152. Calculating step 222 determines the width of the vector shape 120 at control point 152, then at step 224 the system 8 calculates the two surrounding control points 151 and 153. In step 226 the system 8 replaces the exterior contour 102 with the new vector shape contour 120.

Referring back to FIG. 5A, at step 228 the system 8 checks for more contours from the vector shape 106. If the vector shape 106 contains more contours, and vector shape 106 does contain another contour 104, then at step 230 the system 8 reads the interior contour 104 from the vector shape database 30 and returns to step 204. In step 230 the system 8 also varies the values stored in the control variables memory 38 for the next contour according to the values stores in the memory allocations of base pen width variance 48, variance width variance 50, and bulge position variance 52. When there are no more contours, then the system 8 proceeds to end step 300.

Accordingly, the present invention provides a method and apparatus for varying the line width of a computer generated vector graphic. Vector shape data is received and stored by the apparatus, and the apparatus then modifies the original vector shape to produce a graphic having lines of varying widths. The control variables, which can be predetermined or inputted by the user, are utilized to determine how various aspects of the vector shape are to be modified.

While the invention has been described in connection with a preferred embodiment, there is no intent to limit the invention to that embodiment. On the contrary, the intent is to cover all alternatives, modifications and equivalents included within the spirit and scope of the invention as defined by the appended claims.

I claim as my invention:

1. In a computer system having a display device, a method for varying line widths of a vector graphic, the method comprising the steps of:

reading vector shape data having a contour, control points, a bulge position, a bulge width, and a base position;

determining new border control points along the contour using the control points, the bulge position, the bulge width and the base position; and drawing a new variable width contour using the new border control points.

2. The method defined in claim 1, further comprising the steps of:

determining whether a control point is present at the bulge position; and generating a bulge position control point at the bulge position if a control point is not already present at the bulge position.

3. The method defined in claim 1, further comprising the step of:

displaying a vector shape having a contour with a new width on the display device.

4. The method defined in claim 1, further comprising the step of:

reading control variables of a control variables memory including a base pen width value.

5. The method defined in claim 1, further comprising the steps of:

reading points of the contour;

reading a base pen width memory;

reading a variable width memory;

reading a bulge position memory; and calculating the new border control points.

6. The method defined in claim 5, further comprising the steps of calculating a contour width at a specific control point after the bulge position, including the steps of:

determining a percentage of a value stored in a variable width memory allocation being equivalent to a total length of the contour minus a length of the contour up to the specific control point;

dividing the percentage of a value by the length of the contour at the bulge position to produce a resulting value;

adding a stored value of the base pen width memory to the resulting value to determine the contour width at the specific control point; and generating the contour width at the specific control point.

7. The method defined in claim 5, further comprising the step of calculating a contour width at a specific control point before the bulge position, including the steps of:

determining a percentage of a value stored in a variable width memory allocation being equivalent to a length of the contour up to the specific control point;

dividing the percentage of a value by the length of the contour at the bulge position to generate a resulting value;

adding a stored value of the base pen width memory to the resulting value to determine the contour width at the specific control point; and generating the contour width at the specific control point.

8. In a computer system having a display device, a method for varying line widths of a vector graphic, the method comprising the steps of:

reading vector shape data having a contour, control points, a bulge position, a bulge width, and a base position;

determining new border control points along the contour by performing the steps of calculating a contour width at a specific control point before the bulge position, including the steps of determining a percentage of a value stored in a variable width memory allocation being equivalent to a length of the contour up to the specific control point, dividing the percentage of a value by the length of the contour at the bulge position to generate a resulting value, adding a stored value of the base pen width memory to the resulting value to determine the contour width at the specific control point, and generating the contour width at the specific control point, and calculating two new border control points surrounding a current control point to generate a new contour width, including the steps of determining a slope of the current control point by connecting, via a straight line, control points of the contour on opposing sides of the current control point, and the slope of the straight line is the slope of the current control point, and generating two new border control points at opposing sides of the current control point and each new border control point positioned a distance perpendicular to the slope equal to one half the new contour width; and drawing a new variable width contour comprising the new border control points from the base position to the bulge position.

9. In a computer system having a display device, a method for varying line widths of a vector graphic, the method comprising the steps of:

reading vector shape data having at contour, control points, a bulge position, a bulge width, and a base position;

determining new border control points along the contour; and drawing a new variable width contour using the new border control points from the base position to the bulge position; and determining if more than one contour is contained within a vector shape.

10. A computer for varying width of vector shape, a processor;

an operating system memory coupled to the processor;

a vector shape database memory coupled to the processor for storing data that defines a vector shape;

a stroke routines memory coupled to the processor for controlling the operating system memory and the processor; and a control variables memory coupled to the processor for storing control variables that direct the stroke routines memory.

11. The computer system defined in claim 10, further comprising:

a slope of contour memory coupled to the vector shape database memory for storing a slope of a contour.

12. The computer system defined in claim 10, further comprising:

a left contour memory coupled to the processor for storing a first set of new border control points; and a right contour memory coupled to the processor for storing a second set of new border control points.

13. A computer for varying width of vector shape, a processor;

an operating system memory coupled to the processor;

a vector shape database memory coupled to the processor for storing data that defines a vector shape;

a stroke routines memory coupled to the processor for controlling the operating system memory and the processor; and a control variables memory coupled to the processor for storing control variables that direct the stroke routines memory, said control variables memory including a base pen width memory allocation coupled to the vector shape database for storing a minimum width of a resulting vector shape, a variable width memory allocation coupled to the vector shape database for storing a maximum width of a resulting vector, and a bulge position memory allocation coupled to the vector shape database for storing a percentage of a contour length at which the greatest width of a resulting vector shape is located.

14. A computer for varying width of vector shape, a processor:

an operating system memory coupled to the processor;

a vector shape database memory coupled to the processor for storing data that defines at vector shape;

a stroke routines memory coupled to the processor for controlling the operating system memory and the processor; and a control variables memory coupled to the processor for storing control variables that direct the stroke routines memory, the control variables memory including a base pen width variance memory allocation coupled to the vector shape database for storing a value by which the base pen width varies from contour to contour, a variable width variance memory allocation coupled to the vector shape database for storing a value by which a variable width is varied from contour to contour, and a bulge position variance memory allocation coupled to the vector shape database for storing a value by which the bulge position varies from contour to contour.

15. In a computer system having a display device, an apparatus for varying line widths of a vector graphic having a base width and at least one contour, the apparatus comprising:

means for reading vector shape data having a contour, control points, a bulge position, a bulge width, and a base position;

means for determining new border control points along the contour comprising the control points, the bulge position, the bulge width and the base position; and     means for drawing a new variable width contour using the new border control points.

16. The apparatus defined in claim 15, further comprising:

means for verifying that a control point exists at the bulge position; and     means for generating the control point if none exists at the bulge position.

17. The apparatus defined in claim 15, further comprising:

means for displaying a vector shape having a contour with a new width on the display device.

18. In a computer system having a display device, an apparatus for varying line widths of a vector graphic having a base width and at least one contour, the apparatus comprising:

means for reading vector shape data having a contour, control points, a bulge position, a bulge width, and a base position;

means for determining new border control points along the contour;

means for drawing a new variable width contour using the new border control points from the base position to the bulge position; and     means for reading control variables of a control variables memory.

19. In a computer system having a display device, an apparatus for varying line widths of a vector graphic having a base width and at least one contour, the apparatus comprising:

means for reading vector shape data having a contour, control points, a bulge position, a bulge width, and a base position:

means for determining new border control points along the contour; and     means for drawing a new variable width contour using the new border control points from the base position to the bulge position;

means for determining a percentage of a value stored in the variable width memory allocation being equivalent to a length of the contour up to the specific control point;

means for dividing the percentage of a value by the length of the contour at the bulge position to generate a resulting value;

means for adding a stored value of the base pen width memory to the resulting value to determine the contour width at the specific control point; and     means for generating the contour width at the specific control point.

20. In a computer system having a display device, an apparatus for varying line widths of a vector graphic having a base width and at least one contour, the apparatus comprising:

means for reading vector shape data having a contour, control points, a bulge position, a bulge width, and a base position;

means for determining new border control points along the contour; and     means for drawing a new variable width contour using the new border control points from the base position to the bulge position; and     means for determining if more than one contour is contained within a vector shape.

\* \* \* \* \*